(12) United States Patent
Herriot

(10) Patent No.: US 6,424,427 B1
(45) Date of Patent: *Jul. 23, 2002

(54) METHOD AND APPARATUS FOR REPRESENTING PRINT JOBS USING A COMPACT FORMAT

(75) Inventor: Robert G. Herriot, Palo Alto, CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,699

(22) Filed: Mar. 31, 1997

(51) Int. Cl.[7] ................................................. B41B 1/00
(52) U.S. Cl. ..................................... 358/1.16; 358/1.15
(58) Field of Search ..................... 395/114–118, 101, 395/831; 364/478.09; 358/1.13–1.14, 1.15, 1.18; 707/523, 513, 518, 515, 10, 2, 9; 709/200, 230, 207, 206, 219; 710/11; 700/221

(56) References Cited

U.S. PATENT DOCUMENTS

| | | | | |
|---|---|---|---|---|
| 5,612,888 A | * | 3/1997 | Chang et al. | 700/221 |
| 5,619,649 A | * | 4/1997 | Kovnat et al. | 358/1.15 |
| 5,689,625 A | * | 11/1997 | Austin et al. | 358/1.15 |
| 5,742,845 A | * | 4/1998 | Wagners | 710/11 |
| 5,790,790 A | * | 8/1998 | Smith et al. | 709/206 |
| 5,946,458 A | * | 8/1999 | Austin et al. | 358/1.15 |
| 5,974,234 A | * | 10/1999 | Levine et al. | 358/1.16 |
| 5,991,514 A | * | 11/1999 | Nielson | 358/1.14 |

OTHER PUBLICATIONS

R. Fielding et al., "Hypertext Transfer Protocol," *RFC 2068*, University of California–Irvine, Jan. 1997, 134 pages.

T. Berners–Lee, "Hypertext Transfer Protocol", *RFC 1945*, MIT, May 1996, 50 pages.

N. Bornstein et al., "MIME Part One: Mechanisms for Specifying and Describing the Format of Internet Message Bodies," *RFC 1521*, Sep. 1993, 67 pages.

N. Bornstein et al., "Multipurpose Internet Mail Extensions," *RFC 1341*, Bellcore, Jun. 1992, 77 pages.

L, McLaughlin III, "Line Printer Daemon Protocol," The Wollongong Group, *RFC 1179*, Aug. 1990, 12 pages.

R. Braden,"Requirements for Internet Hosts—Application and Support," *RFC 1123*, Internet Engineering Task Force, Oct. 1989, 85 pages.

D. Crocker, "Standard for the Format of ARPA Internet Text Messages," *RFC 822*, University of Delaware, Aug. 13, 1982, 43 pages.

E–mail between members of IETF Printer working group, Nov. 12, 1996–Dec. 10, 1996.

"Presentation: Locating a Printer," date unknown.

"Why use HTTP?" Presentation date unknown.

HTPP Proposal, "Internet Print Protocol Proposal," presented at IETF Printer Working Group, Nov. 1996, New Orleans, LA.

S. Isaacson et al., "LDPA–Lightweight Document Printing Application Version 0.8," Oct. 31, 1996.

S. Isaacson et al., "LDPA Data Types Using XDR Version 0.8," Oct. 31, 1996.

\* cited by examiner

*Primary Examiner*—Bhavesh Mehta
*Assistant Examiner*—Ishrat Sherali
(74) *Attorney, Agent, or Firm*—Squire, Sanders & Dempsey, L.L.P.

(57) ABSTRACT

A method and apparatus for sending and receiving a print job as an HTTP request version of the MIME protocol, using an entity-body having content-types of "application/jobAttributes" and "application/documentAttributes". The documents can be structured to as many levels as desirable.

23 Claims, 7 Drawing Sheets

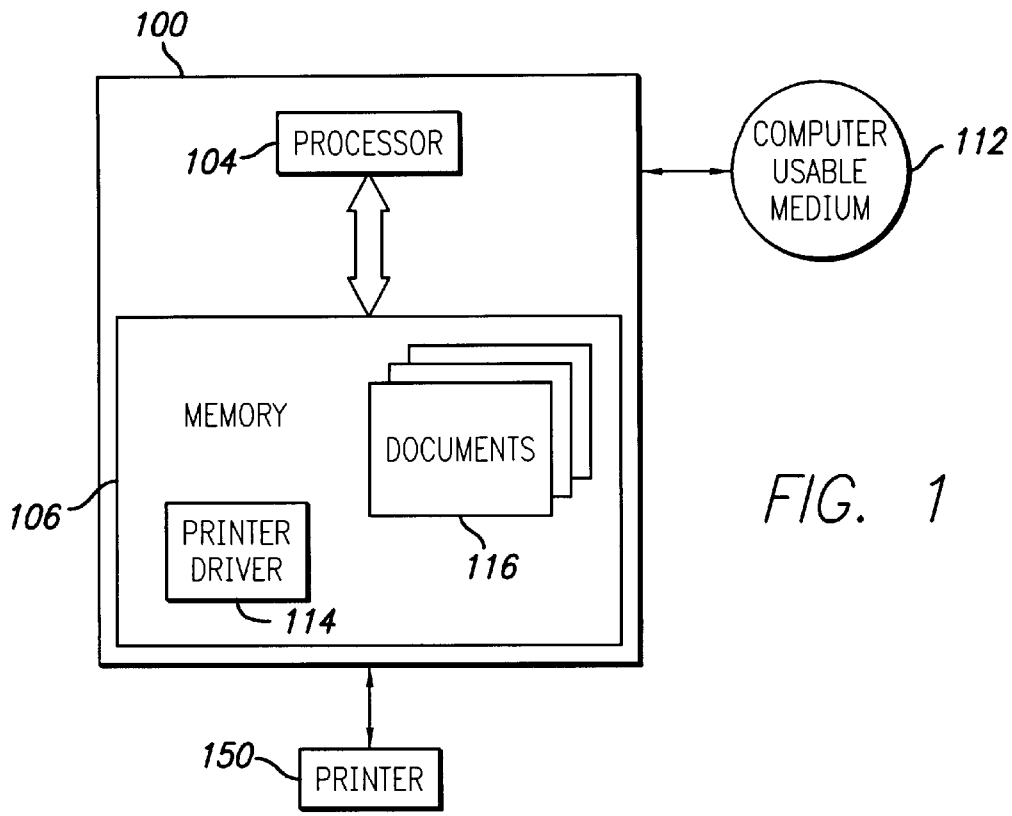
FIG. 1
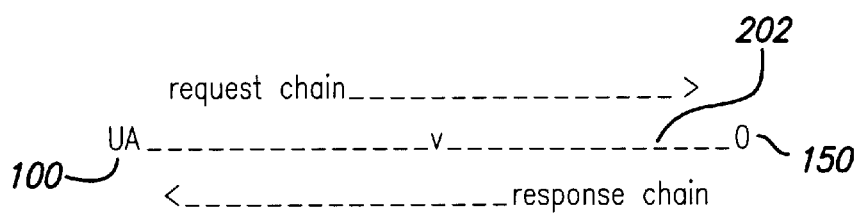
FIG. 2
Syntax for a Message:
Message=*header
CRLF
[entity-body]
FIG. 3(a)

Syntax of one particular header:   305

302 — Content-Type="Content-Type" ":" media-type 306   308 media-type =type "/" subtype *(":" parameter)   type   =token
subtype =token
parameter =attribute "=" value
attribute =token
value =token | quoted-string Examples:

Content-Type: text/html; charset=ISO-8859-4

Content-Type: multipart/mixed; boundary=gc0p4Jq0M2Yt08jU534c0p

FIG. 3(b)

Syntax of value for the boundary parameter of multipart:

boundary :=0*69<bchars>bcharsnospace bchars :=bcharsnospace/ " "

bcharsnospace := DIGIT/ALPHA/"'"/"("/")"/"+"/"_"/","/"-"/"."/"/"/":"/ "="/"?"

Syntax of entity-body whose Content-Type is multipart:

multipart-body :=preamble 1*encapsulation
        close-delimiter epilogue encapsulation :=delimiter body-part CRLF delimiter :="_"boundary CRFL ; taken from Content-Type field. ; There must be no space ; between "_" and boundary.
    close-delimiter :="__"boundary "_"CRFL ; Again, no space by "_",
preamble :=discard-text ; to be ignored upon receipt.

epilogue :=discard-text ; to be ignored upon receipt.
discard-text := *(*text CRLF)

body-part :=<"message" as defined in RFC 822,
        with all header fields optional, and with the specified delimiter not occurring anywhere in the message body, either on a line by itself or as a substring anywhere. Note that the semantics of a part differ from the semantics of a message, as described in the text.>

Example of multipart/mixed

Content-Type: multipart/mixed; boundary=gc0p4Jq0M2Yt08jU534c0p
From: Nathaniel Borenstein <nsb@bellcore.com>
To: Ned Freed <ned@innosoft.com>
Subject: Sample message
MIME-Version: 1.0

Content-type: multipart/mixed; boundary="simple boundary"
This is the preamble. It is to be ignored, though it is a handy place for mail composers to include an
explanatory note to non-MIME confromant readers.
--simple boundary This is implicitly typed plain ASCII text.
It does NOT end with a linebreak.
--simple boundary
Content-type: text/plain; charset=us-ascii This is explicitly typed plain ASCII text.
It DOES end with a linebreak.

--simple boundary--
This is the epilogue. It is also to be ignored.

320
322
324

Subtypes for "multipart": /350
   mixed
   related-to
   ...

Subtypes for "application": /352
   postscript
   vnd.hp-PCL /360
   documentAttributes
   jobAttributes ~362
   ...

Subtypes for "text": /354
   plain
   ...

Subtypes for "fax": /356
   g3

FIG. 4

```
   ⎧ Content-type: mulipart/mixed; 415      --Outer message "wrapper"
404⎨ Content-type: application/jobAttributes; --Job attribute set
   ⎩   Username: Jane Doe  416
   ⎧ Content-type: application/postscript    --The 1st document
406⎨   %!PS-...
   ⎩   ...
408{ Content-type: application/vnd.hp-PCL    --The 2nd document
   ⎩   ...
   ⎧ Content-type: multipart/mixed           --The 3rd document
   ⎪   ...                417
   ⎪ ⎧ Content-type: application/documentAttributes --The 3rd doc options
410⎨420⎨   Sides: one-sided
   ⎪ ⎩   Media:A4
   ⎪ ⎧   ...
   ⎪422⎨ Content-type: text/plain            --The 3rd document text
   ⎩ ⎩   ...
   ⎧ Content-type: multipart/alternative    --The 4th document
   ⎪   ...
   ⎪ ⎧ Content-type: application/postscript  --The 4th doc alternative
412⎨424⎨   ...
   ⎪ ⎩
   ⎪ ⎧ Content-type: text/plain             --The 4th document alternative
   ⎩426⎨   ...
     ⎩
414{ Content-type: text/plain               --The 5th document
        ......
```

402 (encompassing all above)

METHOD AND APPARATUS FOR REPRESENTING PRINT JOBS USING A COMPACT FORMAT

FIELD OF THE INVENTION

This application relates to printing methods and, specifically, to a method and apparatus for representing print jobs.

BACKGROUND OF THE INVENTION

Print jobs are represented using a variety of protocols. Such protocols usually include a representation of the data to be printed and a description of how the printer communicates with the device sending the print job. For example, RFC (Request for Comments) 1179 describes a line printer daemon protocol. This protocol was designed solely as a printing protocol. In contrast, RFC 822 and RFC 1521 describe the MIME (Multi-purpose Internet Mail Extensions) protocol. This protocol was designed primarily for use with e-mail.

The growing popularity of the Internet has led to changes in how people look at computer systems and how computer systems communicate. What is needed is a protocol that is simple and can be used by a wide variety of components in a computer network, and that can also be used as a printer protocol.

SUMMARY OF THE INVENTION

The present invention overcomes the problems and disadvantages of the prior art by representing data to be printed using a compact format compatible with the format used in the HTTP version of the MIME protocol. A preferred embodiment of the present invention adds certain extensions to the HTTP version of the MIME protocol to make it usable as a printer protocol.

In accordance with the purpose of the invention, as embodied and broadly described herein, the invention is a method of sending a print job to a printer, comprising the steps performed by a data processing system having a memory, of: creating, in the memory, an "application/jobAttributes" entity for the print job; creating, in the memory, an entity for a document in the print job; sending the created entities to the printer as an HTTP request; and receiving an HTTP response from the printer, specifying a status of the print job.

In further accordance with the purpose of this invention, as embodied and broadly described herein, the invention is a printer, comprising: a portion configured to receive, as an HTTP request, an "application/jobAttributes" entity and an entity for a document in a print job; a printing portion configured to print the document in accordance with the "application/jobAttributes" entity and the entity for the document; and a portion configured to send an HTTP response from the printer indicating a status of the printing portion.

In further accordance with the purpose of this invention, as embodied and broadly described herein, the invention is a method of sending a print job including a document to a printer, comprising the steps performed by a data processing system having a memory, of: creating in the memory, one of a MIME entity having a content-type describing an attribute for the print job or a MIME entity having a content-type describing an attribute for the document; creating in the memory a MIME entity for the contents of the document, and sending the created entities to the printer.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 is a block diagram of a computer system in accordance with a preferred embodiment of the present invention.

FIG. 2 is a diagram of a request chain and a response chain sent between a user agent and an origin server in accordance with the HTTP protocol.

FIGS. 3(a) through 3(c) show a syntax of a print job sent to a printer in accordance with the embodiment of FIG. 1.

FIG. 3(d) shows an example of a "multipart/mixed" message.

FIG. 4 shows an example of a print job using the syntax of FIGS. 3(a) through 3(e).

DETAILED DESCRIPTION OF THE PREFERRED EMBODIMENTS

Figures 3E, 5:
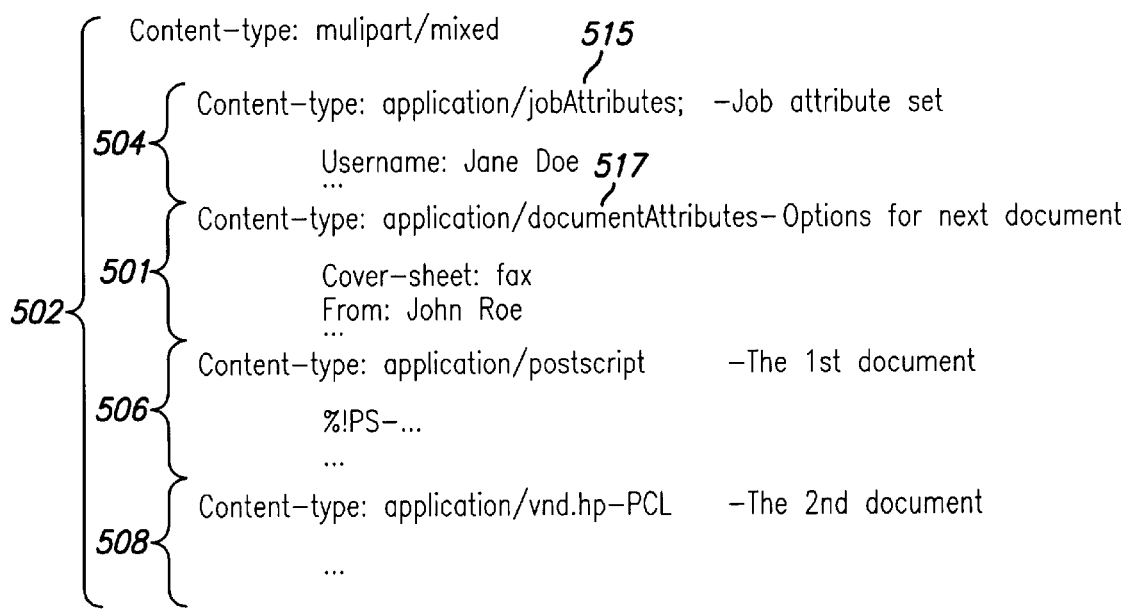
FIG. 3(e) shows examples of types and subtypes in accordance with a preferred embodiment of the present invention.
FIG. 5 shows another example of a print job using the syntax of FIGS. 3(a) through 3(e).

Reference will now be made in detail to the preferred embodiments of the invention, examples of which are illustrated in the accompanying drawings. Wherever possible, the same reference numbers will be used throughout the drawings to refer to the same or like parts.

FIG. 1 is a block diagram of a computer system implementing a preferred embodiment of the present invention. FIG. 1 includes a computer system 100 connected to a printer 150. The computer system preferably includes a processor 104, a memory 106, and a computer readable input device 112 for reading a computer-usable medium storing program code (such as printer driver 114 and/or software controlling the operation of printer 150). Memory 106 includes printer driver software 114 and one or more documents 116. Printer driver 114 communicates with printer 150 to print documents 116. Information sent from computer 100 to printer 150 is called a "print job." A print job may contain one or more documents. Printer driver 114 sends print jobs to printer 150 that have a format as shown in FIGS. 2 and 3. A print job sent to printer 150 is compatible with the HTTP protocol, but has several extensions added to make the HTTP version of the MIME protocol viable for print jobs. The present invention can be used in printer configurations other than that shown in FIG. 1. For example, a client computer can send a print job in accordance with the present invention to a print server (not shown).

The following paragraphs provide a general discussion of the HTTP version of the MIME protocol. After the HTTP version of the MIME protocol is described, a discussion of the present invention is provided in conjunction with an example. The HTTP (Hypertext Tranfer Protocol) is described in RFC 2068, which is hereby incorporated by reference. HTTP is currently used for many tasks, such as name servers and distributed object management. The HTTP protocol is also used, for example, by entities in the World Wide Web.

HTTP protocol is a request/response protocol. A client sends a request to a server in the form of a request method, URI (Uniform Resource Identifier), and protocol version, followed by a MIME-like message containing request modifiers, client information, and possible body content over a connection with a server. The server responds with a status line, including the message's protocol version and a success or error code, followed by a MIME-like message containing server information, entity meta-information, and possible entity-body content.

A preferred embodiment of the present invention is initiated by a user agent and includes a request to be applied to a resource on some origin server. FIG. 2 shows a simple case, which may be accomplished via a single connection 202 between the user agent UA (such as computer 100) and an origin server O (such as printer 150). In the present invention, a preferred embodiment, connection 202 may be used for one or more request/response exchanges, although connections may be closed for a variety of reasons.

FIGS. 3(a) through 3(e) show a syntax of a print job sent to printer 150 in accordance with the embodiment of FIG. 1. The following paragraphs first discuss a general notation convention and then use an augmented BNF to describe the syntax used to send a print job to a printer. All of the mechanisms specified in this document are described in both prose and an augmented Backus-Naur Form (BNF) similar to that used by RFC 2068. The augmented BNF includes the following constructs.

A. Notation Conventions
name=definition

The name of a rule is simply the name itself (without any enclosing "<" and ">") and is separated from its definition by the equal "=" character. Whitespace is only significant in that indentation of continuation lines is used to indicate a rule definition that spans more than one line. Certain basic rules are in uppercase, such as SP, LWS, HT, CRLF, DIGIT, ALPHA, etc. Angle brackets are used within definitions whenever their presence will facilitate discerning the use of rule names.
"literal"

Quotation marks surround literal text. Unless stated otherwise, the text is case-insensitive.
rule1 | rule2

Elements separated by a bar ("|") are alternatives, e.g., "yes | no" will accept yes or no.
(rule1 rule2)

Elements enclosed in parentheses are treated as a single element. Thus, "(elem (foo | bar) elem)" allows the token sequences "elem foo elem" and "elem bar elem".
*rule The character "*" preceding an element indicates repetition. The full form is "<n>*<m>element" indicating at least <n> and at most <m> occurrences of element. Default values are 0 and infinity so that "*(element)" allows any number, including zero; "1*element" requires at least one; and "1*2element" allows one or two.
[rule]

Square brackets enclose optional elements; "[foo bar]" is equivalent to "*1(foo bar)".

N rule

Specific repetition: "<n>(element)" is equivalent to "<n>*<n>(element)"; that is, exactly <n> occurrences of (element). Thus 2DIGIT is a 2-digit number, and 3ALPHA is a string of three alphabetic characters.
rule A construct "#" is defined, similar to "*", for defining lists of elements. The full form is "<n>#<m>element" indicating at least <n> and at most <m> elements, each separated by one or more commas (",") and optional linear whitespace (LWS). This makes the usual form of lists very easy; a rule such as "(*LWS element *(*LWS "," *LWS element))" can be shown as "1#element". Wherever this construct is used, null elements are allowed, but do not contribute to the count of elements present. That is, "(element), , (element)" is permitted, but counts as only two elements. Therefore, where at least one element is required, at least one non-null element must be present. Default values are 0 and infinity so that "#element" allows any number, including zero; "1#element" requires at least one; and "1#2element" allows one or two.
; comment A semi-colon, set off some distance to the right of rule text, starts a comment that continues to the end of line. This is a simple way of including useful notes in parallel with the specifications.
implied *LWS The grammar described by this specification is word-based. Except where noted otherwise, linear whitespace (LWS) can be included between any two adjacent words (token or quoted-string), and between adjacent tokens and delimiters (tspecials), without changing the interpretation of a field. At least one delimiter (tspecials) must exist between any two tokens, since they would otherwise be interpreted as a single token.

B. Syntax Rules
1. Basic Rules

The following rules are used throughout this document to describe basic parsing constructs. The US-ASCII coded character set is defined by ANSI X3.4-1986.

| | |
|---|---|
| OCTET | = <any 8-bit sequence of data> |
| CHAR | = <any US-ASCII character (octets 0–127)> |
| UPALPHA | = <any US-ASCII uppercase letter "A" . . . "Z"> |
| LOALPHA | = <any US-ASCII lowercase letter "a". . . "z"> |
| ALPHA | = UPALPHA | LOALPHA |
| DIGIT | = <any US-ASCII digit "0". . . "9"> |
| CTL | = <any US-ASCII control character (octets 0–31) and DEL (127)> |
| CR | = <US-ASCII CR, carriage return (13)> |
| LF | = <US-ASCII LF, linefeed (10)> |
| SP | = <US-ASCII SP, space (32)> |
| HT | = <US-ASCII HT, horizontal-tab (9)> |
| <"> | = <US-ASCII double-quote mark (34)> |

HTTP, version 1.1 defines the sequence CR LF as the end-of-line marker for all protocol elements except the entity-body. The end-of-line marker within an entity-body is defined by its associated media type.

CRLF=CR LF

HTTP version 1.1 headers can be folded onto multiple lines if the continuation line begins with a space or horizontal tab. All linear white space, including folding, has the same semantics as SP.

LWS=[CRLF] 1*(SP | HT)

The TEXT rule is only used for descriptive field contents and values that are not intended to be interpreted by the message parser. Words of *TEXT may contain characters from character sets other than ISO 8859-1 only when encoded according to the rules of RFC 1522.

TEXT=<any OCTET except CTLs, but including LWS>

Hexadecimal numeric characters are used in several protocol elements.

HEX="A" | "B" | "C" | "D" | "E" | "F" | "a" | "b" | "c" | "d" | "e" | "f" | DIGIT

Many HTTP version 1.1 header field values consist of words separated by LWS or special characters. These special characters must be in a quoted string to be used within a parameter value.

token=1*<any CHAR except CTLs or tspecials> tspecials="(" | ")" | "<" | "<" | """
| "," | ";" | ":" | "\" | <">
| "/" | "[" | "]" | "?" | "="
| "{" | "}" | SP | HT Comments can be included in some HTTP header fields by surrounding the comment text with parentheses. Comments are only allowed in fields containing "comment" as part of their field value definition. In all other fields, parentheses are considered part of the field value.

comment="(" *(ctext | comment) ")"

ctext=<any TEXT excluding "(" and ")">

A string of text is parsed as a single word if it is quoted using double-quote marks.

quoted-string=(<"> *(qdtext) <">)

qdtext=<any TEXT except <">>

The backslash character ("\") may be used as a single-character quoting mechanism only within quoted-string and comment constructs.

quoted-pair="\" CHAR

2. A Protocol in Accordance with the Present Invention

An HTTP "request" includes a request-line (not shown in FIG. 3(a)), various headers, and a message, which is usually an entity-body (see FIG. 3(a)). In the described embodiment, a print job is sent to the printer as a message. The various headers give information about the entity body, which is itself opaque (i.e., the content of the entity-body does not have nay meaning within the protocol). The format of conventional headers is well-known.

A header specifies information about the message. For example, as shown in FIG. 3(b), a content-type 302 is an example of a header. As indicated in FIG. 3(b), a content-type includes the string "Content-Type", followed by a colon, followed by a media-type 305. FIG. 3(b) further defines a media type as a type 306, followed by a "I" character, followed by a subtype 308 and an optional list of zero or more parameters.

Examples of a header are:

Content-Type: text/html; charset=ISO-8859-4

Content-Type: multipart/mixed; boundary= gc0p4Jq0M2Yt08jU534c0p

FIG. 3(c) further defines the syntax of a boundary parameter and of an entity-body whose content-type is multi-part. FIG. 3(d) shows an example of a "multipart/mixed" message 320.

FIG. 3(e) shows example subtypes for various types. It will be understood that these types and subtypes are presented herein for purposes of example only and are not intended to limit the invention described herein. Other types and subtypes may be used in protocols that are in accordance with the present invention.

As indicated by reference numeral 350, the "multipart" type can have subtypes of at least "mixed" and "related-to" (as described in RFC 1872, which is herein incorporated by reference) (other subtypes are possible). As indicated by reference numeral 352, the "application" type can have subtypes of at least "postscript", "vnd.hp-PCL", "documentAttributes" 360, and "jobAttributes" 362 (other subtypes are possible). As indicated by reference numeral 354, the "text" type can have subtypes of at least "plain" (other subtypes are possible). As indicated by reference numeral 354, the "fax" type can have subtypes of at least "g3". Other types and subtypes exist, as defined in HTTP V1.0.

FIG. 4 shows an example of a print job. having a single entity-body 402 using the format of FIGS. 3(a) through 3(e). The format has content-types that a printer can process. A first entity-body 404 has a content-type of "application/jobAttributes" (or some string equivalent to "jobAttributes" 415) and contains information about the print job. Such information generally describes how the print job is to be printed. It may include a username as shown in FIG. 4. Other examples of information for the print job that might be included in an "application/jobAttributes" entity includes: finishing information (e.g., whether the printer should staple or punch the documents), sides information (e.g., whether the documents should be printed one-sided or two-sided), job priority, the media on which to print, the number of copies, or whether job sheets should be printed. Any information appropriate to a job can be included in an "application/jobAttributes" entity. In the example, the username of the user who owns the job is "Jane Doe" 416.

In the example, the print job has five documents: a PostScript document, a PCL document, two structured documents, and a text document. An entity-body 406 represents a first document and has a content-type of "application/postscript". An entity-body 408 represents a second document and has a content-type of "application/vnd.hp-PCL". An entity-body 410 represents a third document. In the example, entity-body 410 includes document attributes and document data and, thus, has a content type of "multipart/mixed". Entity-body 410 includes two entity bodies 420 and 422. Entity body 420 has a content-type "application/documentAttributes" (or some string equivalent to "documentAttributes") 417 and contains information about the next document in entity 410. Such information generally describes how the next document is to be printed. In FIG. 4, the next document is to be printed on one side of the paper (i.e., one-sided) and printed on A4 paper. Other examples of information for the next document that might be included in an "application/documentAttributes" entity include: font information (e.g., what font to use when printing the document) and the margins to use when printing the document. Any information appropriate to a document can be included in an "application/documentAttributes" entity. Entity body 422 is the document data for the third document and has a content-type "text/plain".

An entity-body 412 represents a fourth document. In the example, entity-body 412 has a content type of "multipart/alternative". Entity-body 412 includes two alternative representations of the same document: entity-bodies 424 and 426. Entity body 424 has a content-type "application/postscript". Entity body 426 has a content-type "text/plain".

An entity-body 414 represents a fifth document, and has a content-type of "text/plain". The example of FIG. 4 also includes boundary strings (not shown) just after each content-type.

FIG. 5 shows another example of a print job using the format of FIGS. 3(a) through 3(e). This second example shows an entity 502 with a content type of "multi-part/mixed". Entity 502 contains document attributes and document data. The attributes include: content-type "application/jobAttributes" 504 at the same level as an entity with content-type "application/documentAttributes" 501. Such a format avoids having multipart/mixed structure documents deeper within the document 506 (or any other documents in the print job).

Entity body 504 has a content-type of "application/jobAttributes" (or some string equivalent to "jobAttributes" 515) and contains information about the print job similar to that of FIG. 4. In the example, entity-body 501 has a content type of "application/documentAttributes" (or some string equivalent to "documentAttributes") 517 and contains information about the next document (but not about all documents in the job).

In the example, the print job has two documents: a PostScript document and a PCL document. An entity-body 506 represents a first document and has a content-type of "application/postscript". An entity-body 508 represents a second document and has a content-type of "application/vnd.hp-PCL". The example of FIG. 5 also includes boundary strings (not shown) at the end of each content-type.

Figure 6A:
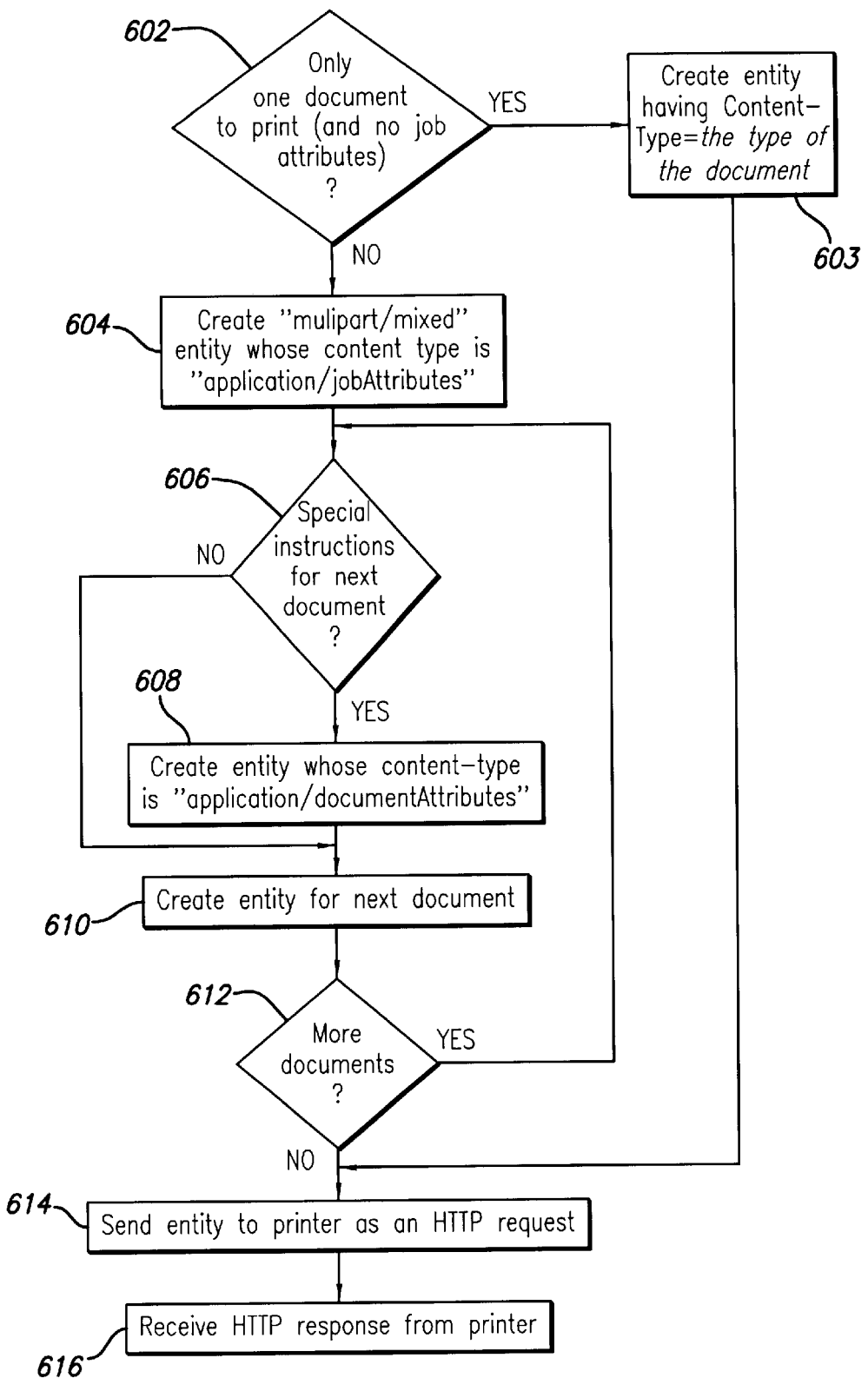
FIG. 6(a) is a flow chart of steps performed by a client to send a print job to a printer.
Figure 6B:
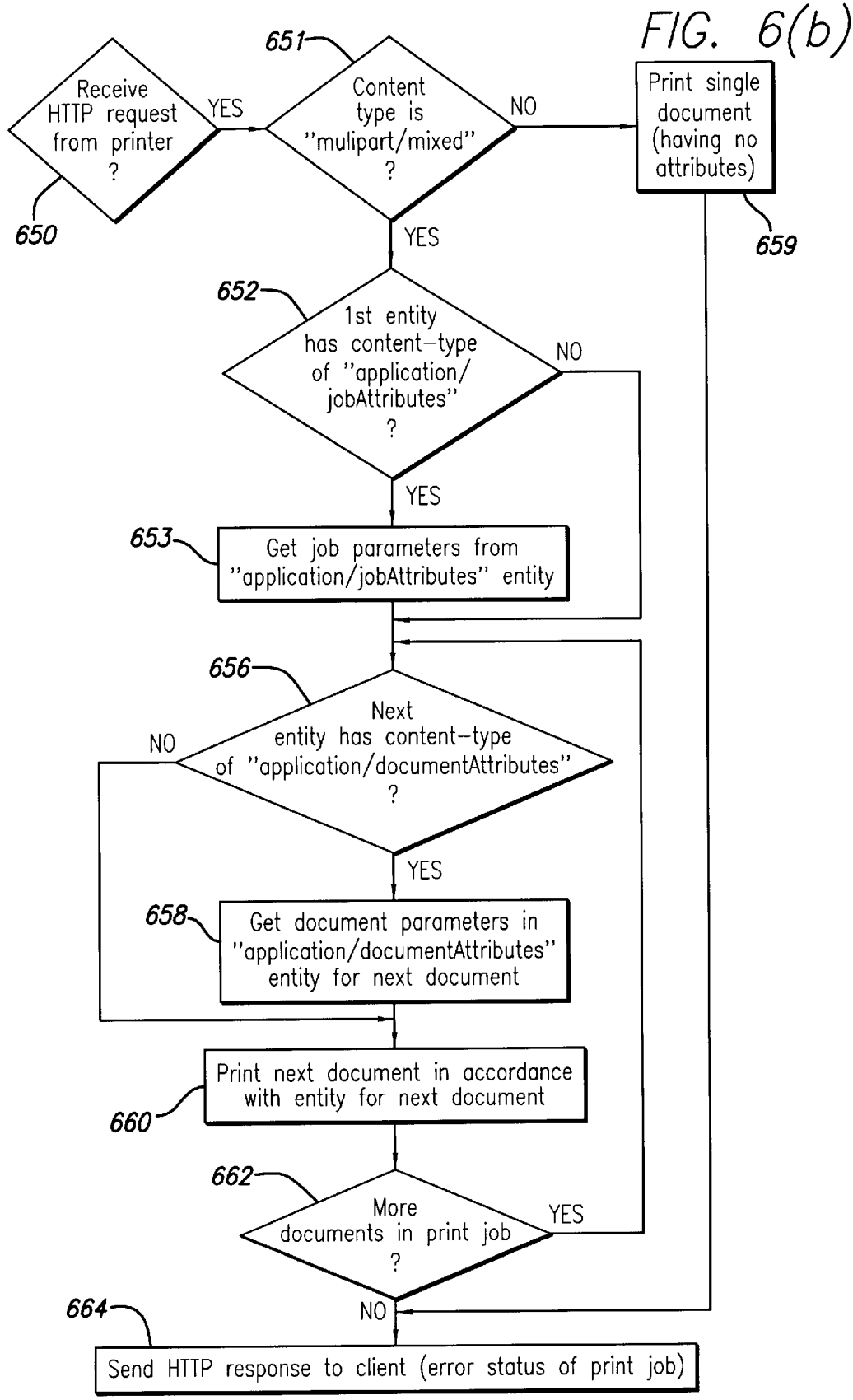
FIG. 6(b) is a flow chart of steps performed by the printer to print a print job and to send a response to the client.

FIG. 6(*a*) is a flow chart of steps performed by a client to send a print job to a printer. The client may be, for example, printer driver 114 of FIG. 1. If, in step 602, there is more than one document to print or attributes within a single document, control passes to step 604. In step 604, the client creates an "application/jobAttributes" entity having information about the print job. In step 606, the client determines whether there are document attributes for the next document to be printed. If so, control passes to step 608. Otherwise, control passes to step 610. In step 608, the client creates an "application/documentAttributes" entity for the next document. In step 610, the client creates an entity for the next document. In step 612, if there are more documents, control passes to step 606. Otherwise, control passes to step 614.

In step 603, printer driver 114 creates an entity for a single document having a content-type of the document to print and control passes to step 614.

In step 614, the client sends the created entities to the printer as an HTTP request. The printer attempts to print the print job. Then, In step 616, the client receives an HTTP response from the printer, including an error status message for the print job.

FIG. 6(*b*) is a flow chart of steps performed by the printer to print a print job and to send a response to the client. If, in step 650, the printer receives a print job, control passes to step 651.

In step 651, if the content-type of the first component in the print job is "multipart/mixed", then control passes to step 652. Otherwise control passes to step 659. In step 652, if the first component in the multipart/mixed entity has a content-type of "application/jobAttributes", control passes to step 653. Otherwise control passes to step 656.

In step 653, the printer gets the job attributes from the "application/jobAttributes" entity. In step 656, if the content-type of the next entity is "application/documentAttributes", control passes to step 658. This content-type represents that the entity contains one or more document attributes for the next document Otherwise, control passes to step 660. In step 658, the printer gets the document attributes in the "application/documentAttributes" entity for the next document. In step 659, the printer prints a single document (since there is no "multipart/mixed" content-type in the first entity.

In step 660, the printer prints the next document as described in the document attributes from step 658 and the job attributes from step 653. In step 662, if there are more documents, control passes to step 656. Otherwise, control passes to step 664. In step 664, the printer sends an HTTP response to the client, including an error status message for the print job.

In summary, the a preferred embodiment of the present invention sends a print job to a printer as an HTTP request using an entity-body having content-types of "application/jobAttributes" and "application/documentAttributes". The documents can be structured to as many levels as desirable.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of sending a multipart print job as a message to a printer, comprising the steps performed by a data processing system having a memory, of:

creating, in the memory a print job as a message in an HTTP request including at least a header and a message portion, wherein the creating step includes:

adding at least one extension to the HTTP request that includes at least one application/jobAttributes entity;

adding to the HTTP request at least one entity that includes at least two alternative representations of a document; and adding at least one extension to the HTTP request that includes at least one application/documentAttributes entity on the same level as the application/jobAttributes entity;

sending the print job as the message in the HTTP request to the printer;

receiving a message in an HTTP response from the printer, specifying a status of the print job;

after creating the print job as an HTTP request, verifying whether the HTTP request includes special instruction for the next document;

creating an entity whose content-type is "application/documentAttributes" if the HTTP request included special instruction for the next document; and creating an entity for the next document, if the HTTP request did not include special instructions for the next document.

2. A method of receiving a multipart print job, the method comprising:

(a) receiving a HTTP request from a client to perform a print job;

(b) verifying whether or not the content-type of the message is multipart/mixed;

(c) printing a single document, having no attributes, if the content-type of the print job message is not multipart/mixed;

(d) verifying whether the first entity has a content-type of "application/jobAttributes", if the content type of the print job message is multipart/mixed;

(e) getting the parameters for the print job from the "application/jobAttributes" entity if the first entity has a content-type of "application/jobAttributes";

(f) verifying if the next entity has a content-type of "application/documentAttributes", if the first entity does not have a content-type of "application/jobAttributes";

(g) getting document parameters in "application/documentAttributes" entity for the next document, if the next entity does have a content-type of "application/documentAttributes";

(h) printing the next document in accordance with the entity for the next document;

(i) verifying whether or not there are more documents in the print job;

(j) returning to (f), if there are more documents in the print job; and (k) sending a HTTP response to the client regarding the status of the print job, including the error status of the print job and successful completion of the print job, if there are no more documents in the print job.

3. A method of sending a multipart print job as a message to a printer, comprising the steps performed by a data processing system having a memory, of:

creating, in the memory a print job as a message in an HTTP request including at least a header and a message portion, wherein the creating step includes:

adding at least one extension to the HTTP request that includes at least one application/jobAttributes entity;

adding to the HTTP request at least one entity that includes at least two alternative representations of a document; and adding at least one extension to the HTTP request that includes at least one application/documentAttributes entity on the same level as the application/jobAttributes entity;

sending the print job as the message in the HTTP request to the printer; and receiving a message in an HTTP response from the printer, specifying a status of the print job;

wherein in the creating step:

the first representation of a document includes an entity body with a first content type; and the second representation includes another entity body with a second content type.

4. A method of sending a multipart print job as a message to a printer, comprising the steps performed by a data processing system having a memory, of:

creating, in the memory a print job as a message in an HTTP request including at least a header and a message portion, wherein the creating step includes:

adding at least one extension to the HTTP request that includes at least one application/jobAttributes entity;

adding to the HTTP request at least one entity that includes at least two alternative representations of a document; and adding at least one extension to the HTTP request that includes at least one application/documentAttributes entity on the same level as the application/jobAttributes entity;

sending the print job as the message in the HTTP request to the printer;

receiving a message in an HTTP response from the printer, specifying a status of the print job;

wherein the application/documentAttributes entity has attributes about the next document to be printed in the print job.

5. A method of sending a multipart print job as a message to a printer, comprising the steps performed by a data processing system having a memory, of:

creating, in the memory a print job as a message in an HTTP request including at least a header and a message portion, wherein the creating step includes:

adding at least one extension to the HTTP request that includes at least one application/jobAttributes entity;

adding to the HTTP request at least one entity that includes at least two alternative representations of a document; and adding at least one extension to the HTTP request that includes at least one application/documentAttributes entity on the same level as the application/jobAttributes entity;

sending the print job as the message in the HTTP request to the printer; and receiving a message in an HTTP response from the printer, specifying a status of the print job;

wherein the print job includes at least one application/jobAttributes entity, the at least one entity having two alternative representations and at least one application/documentAttributes entity.

6. A method of a printer receiving a multipart print job in a message, the method performed by the printer comprising the steps of:

receiving, a message in an HTTP request that includes an extension comprising at least one "application/jobAttributes" entity for specifying instructions for the print job, an entity for a document in the print job that includes at least two alternative representations of the document and an extension that includes at least one application/documentAttributes entity on the same level as the application/jobAttributes;

printing the document in accordance with the "application/jobAttributes" entity, the entity for the document and the application/documentAttributes entity; and sending in a message an HTTP response from the printer indicating a status of the printing step;

wherein the first representation of the document includes an entity body with a first content type; and the second representation includes another entity body with a second content type.

7. A method of a printer receiving a multipart print job in a message, the method performed by the printer comprising the steps of:

receiving, a message in an HTTP request that includes an extension comprising at least one "application/jobAttributes" entity for specifying instructions for the print job, an entity for a document in the print job that includes at least two alternative representations of the document and an extension that includes at least one application/documentAttributes entity on the same level as the application/jobAttributes;

printing the document in accordance with the "application/jobAttributes" entity, the entity for the document and the application/documentAttributes entity; and sending in a message an HTTP response from the printer indicating a status of the printing step;

wherein the application/documentAttributes have attributes about the next document to be printed in the print job.

8. An apparatus for sending a multipart print job as a message to a printer, comprising:

a portion configured to create in a memory a print job as a message in an HTTP request including at least a header and a message part, wherein the create portion includes:

a portion configured to add an extension to the HTTP request that includes at least one application/jobAttributes entity;

a portion configured to add to the HTTP request at least one entity for a document that includes at least two alternative representations of the document; and a portion configured to add an extension to the HTTP request that includes at least one application/ documentAttributes entity on the same level as the application/jobAttributes entity;

a portion configured to send the print job as the message in the HTTP request to the printer; and a portion configured to receive in a message an HTTP response from the printer, specifying a status of the print job;

wherein the first representation of the document includes an entity body with a first content type; and the second representation includes another entity body with a second content type.

9. An apparatus for sending a multipart print job as a message to a printer, comprising:

a portion configured to create in a memory a print job as a message in an HTTP request including at least a header and a message part, wherein the create portion includes:

a portion configured to add an extension to the HTTP request that includes at least one application/ jobAttributes entity;

a portion configured to add to the HTTP request at least one entity for a document that includes at least two alternative representations of the document; and a portion configured to add an extension to the HTTP request that includes at least one application/ documentAttributes entity on the same level as the application/jobAttributes entity;

a portion configured to send the print job as the message in the HTTP request to the printer; and a portion configured to receive in a message an HTTP response from the printer, specifying a status of the print job;

wherein the application/documentAttributes entity has attributes about the next document to be printed in the print job.

10. An apparatus for sending a multipart print job as a message to a printer, comprising:

a portion configured to create in a memory a print job as a message in an HTTP request including at least a header and a message part, wherein the create portion includes:

a portion configured to add an extension to the HTTP request that includes at least one application/ jobAttributes entity;

a portion configured to add to the HTTP request at least one entity for a document that includes at least two alternative representations of the document; and a portion configured to add an extension to the HTTP request that includes at least one application/ documentAttributes entity on the same level as the application/jobAttributes entity;

a portion configured to send the print job as the message in the HTTP request to the printer; and a portion configured to receive in a message an HTTP response from the printer, specifying a status of the print job;

wherein the print job includes at least one applicationsjobAttributes entity, the at least one entity having two alternative representations and at least one application/ documentAttributes entity.

11. A multipart print job printer having a memory, comprising:

a portion configured to receive a message in an HTTP request comprising an extension that includes at least one "application/jobAttributes" entity, an entity for a document in a print job that includes at least two alternative representations of the document, and an extension that includes at least one application/ documentAttributes entity on the same level as the application/jobAttributes entity;

a printing portion configured to print the document in accordance with the "application/jobAttributes" entity, the entity for the document and the application/ documentAttributes entity; and a portion configured to send in a message an HTTP response from the printer indicating a status of the printing portion;

wherein the first representation of the print job includes an entity body with a first content type; and the second representation includes another entity body with a second content type.

12. A multipart print job printer having a memory, comprising:

a portion configured to receive a message in an HTTP request comprising an extension that includes at least one "application/jobAttributes" entity, an entity for a document in a print job that includes at least two alternative representations of the document, and an extension that includes at least one application/ documentAttributes entity on the same level as the application/jobAttributes entity;

a printing portion configured to print the document in accordance with the "application/jobAttributes" entity, the entity for the document and the application/ documentAttributes entity; and a portion configured to send in a message an HTTP response from the printer indicating a status of the printing portion;

wherein the application/documentAttributes entity has attributes about the next document to be printed in the print job.

13. A multipart print job printer having a memory, comprising:

a portion configured to receive a message in an HTTP request comprising an extension that includes at least one "application/jobAttributes" entity, an entity for a document in a print job that includes at least two alternative representations of the document, and an extension that includes at least one application/ documentAttributes entity on the same level as the application/jobAttributes entity;

a printing portion configured to print the document in accordance with the "application/jobAttributes" entity, the entity for the document and the application/ documentAttributes entity; and a portion configured to send in a message an HTTP response from the printer indicating a status of the printing portion;

wherein the printing portion is configured to print the document in accordance with a print job, the print job including at least one application/jobAttributes entity, the at least one entity having two alternative representations and at least one application/documentAttributes entity.

14. A computer program product, comprising:

a computer usable medium having computer code embodied therein for causing a computer to send a multiprint print job as a message to a printer, the computer program product including:

computer readable program code devices configured to cause a computer to effect creating a print job as a message in an HTTP request including at least a header and a message portion, wherein the creating includes:

adding at least one extension to the HTTP request that includes at least one application/jobAttributes entity;

adding to the HTTP request at least one entity that includes at least two alternative representations of a document; and adding at least one extension to the HTTP request that includes at least one application/documentAttributes entity on the same level as the application/jobAttributes entity;

computer readable program code devices configured to cause a computer to effect sending the print job as the message in the HTTP request to the printer; and computer readable program code devices configured to cause a computer to effect receiving a message in an HTTP response from the printer, specifying a status of the print job;

wherein the first representation includes an entity body with a first content type and the second representation includes another entity body with a second content type.

15. A computer program product, comprising:

a computer usable medium having computer code embodied therein for causing a computer to send a multiprint print job as a message to a printer, the computer program product including:

computer readable program code devices configured to cause a computer to effect creating a print job as a message in an HTTP request including at least a header and a message portion, wherein the creating includes:

adding at least one extension to the HTTP request that includes at least one application/jobAttributes entity;

adding to the HTTP request at least one entity that includes at least two alternative representations of a document; and adding at least one extension to the HTTP request that includes at least one application/documentAttributes entity on the same level as the application/jobAttributes entity;

computer readable program code devices configured to cause a computer to effect sending the print job as the message in the HTTP request to the printer; and computer readable program code devices configured to cause a computer to effect receiving a message in an HTTP response from the printer, specifying a status of the print job;

wherein the application/documentAttributes entity has attributes about the next document to be printed in the print job.

16. The method of claim 4, wherein the step of adding at least one extension to the HTTP request including at least one application/jobAttributes entity is performed for each of a plurality of documents in a print job.

17. The method of claim 4, wherein the step of adding at least one extension to the HTTP request including at least one application/documentAttributes entity is performed for each of a plurality of documents in a print job.

18. The method of claim 6, wherein the step of printing a document in accordance with the "application/jobAttributes" entity and the entity for the document is performed for each of a plurality of documents in a print job.

19. The method of claim 7, wherein the application/documentAttributes entity is provided for each of a plurality of documents in a print job.

20. The apparatus of claim 9, wherein the creating portion is configured to add at least one extension to the HTTP request including at least one application/jobAttributes entity for each of a plurality of documents in a print job.

21. The apparatus of claim 9, wherein the creating portion is configured to add at least one extension to the HTTP request including at least one "application/documentAttributes" entity for each of a plurality of documents in a print job.

22. The printer of claim 12, wherein the printing portion includes a portion configured to print a document in accordance with the "application/jobAttributes" entity and with an entity for each of a plurality of documents in a print job.

23. The printer of claim 12, wherein the printing portion performs its function for each of a plurality of documents in a print job.

* * * * *

UNITED STATES PATENT AND TRADEMARK OFFICE
CERTIFICATE OF CORRECTION

PATENT NO. : 6,424,427 B1
DATED : July 23, 2002
INVENTOR(S) : Robert G. Herriot

It is certified that error appears in the above-identified patent and that said Letters Patent is hereby corrected as shown below:

<u>Column 14,</u>
Line 23, change "The method of Claim 6, wherein the step of printing a" to -- The method of Claim 7, wherein the step of printing a --

Signed and Sealed this

Eighteenth Day of March, 2003

JAMES E. ROGAN
*Director of the United States Patent and Trademark Office*